US012709677B2

(12) United States Patent
Ji et al.

(10) Patent No.: US 12,709,677 B2
(45) Date of Patent: Aug. 18, 2026

(54) METHOD FOR PREPARING RUBBER FOR ELASTOMER OF FLEXIBLE JOINT

(71) Applicant: Xi'an Sunward Aeromat Co., Ltd., Xi'an (CN)

(72) Inventors: Jianbo Ji, Xi'an (CN); Changqing Ye, Xi'an (CN); Jing Feng, Xi'an (CN); Yanan Hou, Xi'an (CN); Bo Sun, Xi'an (CN); Gui Zhang, Xi'an (CN); Rui Liu, Xi'an (CN)

(73) Assignee: XI'AN SUNWARD AEROMAT CO., LTD., Xi'an (CN)

( * ) Notice: Subject to any disclaimer, the term of this patent is extended or adjusted under 35 U.S.C. 154(b) by 489 days.

(21) Appl. No.: 18/518,414

(22) Filed: Nov. 22, 2023

(65) Prior Publication Data

US 2024/0084114 A1 Mar. 14, 2024

Related U.S. Application Data

(63) Continuation-in-part of application No. PCT/CN2022/136075, filed on Dec. 2, 2022.

(30) Foreign Application Priority Data

Aug. 30, 2022 (CN) ........................ 202211045280.9

(51) Int. Cl.

| | |
|---|---|
| ***C08L 15/00*** | (2006.01) |
| ***C08J 5/04*** | (2006.01) |
| ***C08K 3/04*** | (2006.01) |
| ***C08K 7/26*** | (2006.01) |

(52) U.S. Cl.

CPC ............ *C08L 15/005* (2013.01); *C08J 5/046* (2013.01); *C08J 2315/00* (2013.01); *C08J 2409/02* (2013.01); *C08J 2477/10* (2013.01); *C08K 3/04* (2013.01); *C08K 7/26* (2013.01)

(58) Field of Classification Search

CPC ..... C08L 15/005; C08J 5/046; C08J 2315/00; C08J 2409/02; C08J 2477/10; C08K 3/04; C08K 7/26

See application file for complete search history.

(56) References Cited

FOREIGN PATENT DOCUMENTS

CN 105086038 A * 11/2015

* cited by examiner

*Primary Examiner* — Patrick D Niland

(74) *Attorney, Agent, or Firm* — MATTHIAS SCHOLL P.C.; Matthias Scholl

(57) ABSTRACT

A method for preparing a rubber for an elastomer of a flexible joint, includes: weighing hydrogenated nitrile raw rubber, a silica reinforcing agent, aramid fiber pulp, carbon black, liquid nitrile rubber, zinc oxide, stearic acid, an antioxidant, and a peroxide crosslinking agent; plasticating the hydrogenated nitrile raw rubber in a first internal mixer at 125-135° C., collecting a resulting product and cooling, to yield a plasticized rubber; preheating the liquid nitrile rubber; adding the plasticized rubber to a second internal mixer, further adding the aramid fiber pulp, the zinc oxide, the stearic acid, and the antioxidant to the second internal mixer for first mixing; adding the carbon black to the second internal mixer for second mixing; adding the silica reinforcing agent and the preheated liquid nitrile rubber to the second internal mixer for third mixing; and collecting a discharged product when a temperature of the second internal mixer is 140° C.

7 Claims, No Drawings

METHOD FOR PREPARING RUBBER FOR ELASTOMER OF FLEXIBLE JOINT

CROSS-REFERENCE TO RELATED APPLICATIONS

This application is a continuation-in-part of International Patent Application No. PCT/CN2022/136075 with an international filing date of Dec. 2, 2022, designating the United States, now pending, and further claims foreign priority benefits to Chinese Patent Application No. 202211045280.9 filed Aug. 30, 2022. The contents of all the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the field of rubber, and more particularly to a method for preparing rubber for an elastomer of a flexible joint.

Flexible joints are a core mechanism of the riser system of offshore oil platforms, and exhibit a certain bearing and rotation capacity. When the offshore oil platforms and the steel catenary riser waggle under the influence of sea wind and ocean current, the flexible joint tends to deflect at a certain angle through the torsion deformation of the elastomer, thus reducing the bending stress on the platforms and the riser.

Elastomers are a key component of flexible joints, and are formed by alternating bonding and vulcanization of several rubber layers and spherical reinforced steel plates. However, the elastomers are prone to fatigue failure due to their harsh operating conditions. Once an elastomer is damaged, it cannot be repaired on site, and may also lead to leakage accidents of flexible joints.

One of critical factors leading to fatigue failure of elastomers is the tear resistance of rubber compounds. The rubber compounds of conventional elastomers have poor tear strength and high-temperature aging resistance, adversely affecting the fatigue life of the elastomers.

SUMMARY

The disclosure provides a method for preparing a rubber for an elastomer of a flexible joint. The prepared rubber has excellent tear strength, and good adhesion performance with reinforced steel plates.

In accordance with one embodiment of the disclosure, the method for preparing a rubber for an elastomer of a flexible joint comprises the following operations:

1) weighing 100 parts by weight of hydrogenated nitrile raw rubber, 15-35 parts by weight of a silica reinforcing agent, 10-25 parts by weight of aramid fiber pulp, 30-50 parts by weight of carbon black, 5-15 parts by weight of liquid nitrile rubber, 3-7 parts by weight of zinc oxide, 0.5-3 parts by weight of stearic acid, 0.5-5 parts by weight of an antioxidant, and 2-8 parts by weight of di-tert-butylperoxyisopropyl benzene as a peroxide crosslinking agent;
2) plasticating the hydrogenated nitrile raw rubber in a first internal mixer at 125-135° C., collecting a resulting product and cooling, to yield a plasticized rubber;

3) preheating the liquid nitrile rubber at a temperature of 80-85° C.;
4) adding the plasticized rubber to a second internal mixer, further adding the aramid fiber pulp, the zinc oxide, the stearic acid, and the antioxidant to the second internal mixer for first mixing; adding the carbon black to the second internal mixer for second mixing; adding the silica reinforcing agent and the preheated liquid nitrile rubber to the second internal mixer for third mixing; collecting a discharged product when a temperature of the second internal mixer is 140° C.;
5) adding the discharged product to an open mill, further adding di-tert-butylperoxyisopropyl benzene to the open mill, and passing a resulting mixture through rollers of the open mill for 5-7 times at 45-55° C., to yield a rubber for an elastomer of a flexible joint.

In a class of this embodiment, the silica reinforcing agent is gas-phase silicon dioxide.

In a class of this embodiment, in 2), the hydrogenated nitrile raw rubber is plasticated in the first internal mixer for 3-4 min.

In a class of this embodiment, in 2), after being plasticated, the hydrogenated nitrile raw rubber is cooled in the first internal mixer for 15-20 hours.

In a class of this embodiment, in 3), the liquid nitrile rubber is preheated for 3-4 hours.

In a class of this embodiment, in 4), the first and second mixing last for 2-3 min, and the third mixing lasts for 3-5 min.

In another aspect, the disclosure also provides a rubber for an elastomer of a flexible joint, being prepared according to the aforesaid method.

The following advantages are associated with the method for preparing a rubber for an elastomer of a flexible joint of the disclosure:

The method uses widely available hydrogenated nitrile raw rubber, silica reinforcing agent, aramid fiber pulp and carbon black as the main raw materials to prepare rubber for elastomers of flexible joints. The rubber exhibits excellent tear strength and high-temperature aging resistance and good adhesion properties with reinforced steel plates, and is suitable for joint elastomers.

The method employs aramid fiber pulp as reinforcing fiber, so that the rubber has excellent high-temperature aging resistance and high tear strength. Because the aramid fiber is highly fibrillated, the length and diameter thereof are regular, and the surface thereof contains a large number of ultrafine fibers in the form of fluff, so that the aramid fiber has large surface area, high toughness, and will not break in the mixing and processing period, and the fiber's aspect ratio is not reduced. The surface of the aramid fiber pulp contains polar groups, such as amide, sulfonic acid and terminal amine group, carboxylic acid group, etc. These functional groups can be conjugated with some of the functional groups of the rubber matrix. The principle is similar to the carbon black to enhance the rubber binding capability, that is, the active points of the elastomer and filler particles interact with each other, so that the rubber substrate has a high mechanical embeddedness, good dispersion and mixing performance, good size and stability, low density, high strength, high temperature resistance, corrosion resistance, fatigue resistance, so it can give the rubber of elastomers with excellent high-temperature aging resistance and high tear strength.

The liquid nitrile rubber used in the disclosure is a reactive plasticizer with a relatively large molecular weight and a molecular chain structure similar to that of hydrogenated nitrile rubber. Therefore, cross-linking reactions occur during the vulcanization process, which can improve the cross-linking density of the hydrogenated nitrile rubber and provides the hydrogenated nitrile rubber with higher mechanical strength and high-temperature resistance. Preheating liquid nitrile rubber before mixing can increase the molecular activity of liquid nitrile rubber, which is conducive to the mutual solubility between liquid nitrile rubber and hydrogenated nitrile rubber molecules, further increasing the mechanical strength of the rubber used in elastomers.

DETAILED DESCRIPTION

To further illustrate the disclosure, embodiments detailing a method for preparing a rubber for an elastomer of a flexible joint are described below. It should be noted that the following embodiments are intended to describe and not to limit the disclosure.

Example 1

1. Weighing 100 parts by weight of hydrogenated nitrile raw rubber Therban 4307, 25 parts by weight of fumed silica, 20 parts by weight of aramid fiber pulp, 40 parts by weight of Cabot carbon black N330, 10 parts by weight of liquid nitrile rubber, 5 parts by weight of zinc oxide, 1 part by weight of stearic acid, 1 part by weight of the antioxidant 4010NA (N-Isopropyl-N'-phenyl-4-phenylenediamin), 1.5 parts by weight of the antioxidant RD (poly(1,2-dihydro-2,2,4-trimethyl-quinoline)), and 4.5 parts by weight of di-tert-butylperoxyisopropyl benzene;
2. Plasticating the hydrogenated nitrile raw rubber in a first internal mixer at 130° C. for 4 min, collecting a resulting product and cooling for 20 hours, to yield a plasticized rubber;
3. Preheating the liquid nitrile rubber in an electromagnetic oven at 80° C. for 3 hours;
4. Adding the plasticized rubber to a second internal mixer, further adding the aramid fiber pulp, the zinc oxide, the stearic acid, the antioxidant 4010NA and the antioxidant RD to the second internal mixer for first mixing for 2 min; adding the Cabot carbon black N330 to the second internal mixer for second mixing for 3 min; adding the fumed silica and the preheated liquid nitrile rubber to the second internal mixer for third mixing for 5 min; collecting a discharged product when a temperature of the second internal mixer is 140° C.;
5. Adding the discharged product to an open mill, further adding di-tert-butylperoxyisopropyl benzene to the open mill, and passing a resulting mixture through rollers of the open mill for 7 times at 45° C., to yield a rubber for an elastomer of a flexible joint.

Example 2

1. Weighing 100 parts by weight of hydrogenated nitrile raw rubber Therban 4307, 30 parts by weight of fumed silica, 15 parts by weight of aramid fiber pulp, 35 parts by weight of Cabot carbon black N330, 12 parts by weight of liquid nitrile rubber, 6 parts by weight of zinc oxide, 1.5 parts by weight of stearic acid, 2 parts by weight of the antioxidant 4010NA (N-Isopropyl-N'-phenyl-4-phenylenediamin), 3 parts by weight of the antioxidant RD (poly(1,2-dihydro-2,2,4-trimethyl-quinoline)), and 8 parts by weight of di-tert-butylperoxyisopropyl benzene;
2. Plasticating the hydrogenated nitrile raw rubber in a first internal mixer at 125° C. for 3 min, collecting a resulting product and cooling for 15 hours, to yield a plasticized rubber;
3. Preheating the liquid nitrile rubber in an electromagnetic oven at 85° C. for 4 hours;
4. Adding the plasticized rubber to a second internal mixer, further adding the aramid fiber pulp, the zinc oxide, the stearic acid, the antioxidant 4010NA and the antioxidant RD to the second internal mixer for first mixing for 3 min; adding the Cabot carbon black N330 to the second internal mixer for second mixing for 3 min; adding the fumed silica and the preheated liquid nitrile rubber to the second internal mixer for third mixing for 4 min; collecting a discharged product when a temperature of the second internal mixer is 140° C.;
5. Adding the discharged product to an open mill, further adding di-tert-butylperoxyisopropyl benzene to the open mill, and passing a resulting mixture through rollers of the open mill for 6 times at 55° C., to yield a rubber for an elastomer of a flexible joint.

Example 3

1. Weighing 100 parts by weight of hydrogenated nitrile raw rubber Therban 4307, 20 parts by weight of fumed silica, 20 parts by weight of aramid fiber pulp, 45 parts by weight of Cabot carbon black N330, 8 parts by weight of liquid nitrile rubber, 4 parts by weight of zinc oxide, 2 parts by weight of stearic acid, 0.2 parts by weight of the antioxidant 4010NA (N-Isopropyl-N'-phenyl-4-phenylenediamin), 0.3 parts by weight of the antioxidant RD (poly(1,2-dihydro-2,2,4-trimethyl-quinoline)), and 2 parts by weight of di-tert-butylperoxy-isopropyl benzene;
2. Plasticating the hydrogenated nitrile raw rubber in a first internal mixer at 125° C. for 3 min, collecting a resulting product and cooling for 18 hours, to yield a plasticized rubber;
3. Preheating the liquid nitrile rubber in an electromagnetic oven at 80° C. for 3.5 hours;
4. Adding the plasticized rubber to a second internal mixer, further adding the aramid fiber pulp, the zinc oxide, the stearic acid, the antioxidant 4010NA and the antioxidant RD to the second internal mixer for first mixing for 2 min; adding the Cabot carbon black N330 to the second internal mixer for second mixing for 2 min; adding the fumed silica and the preheated liquid nitrile rubber to the second internal mixer for third mixing for 5 min; collecting a discharged product when a temperature of the second internal mixer is 140° C.;
5. Adding the discharged product to an open mill, further adding di-tert-butylperoxyisopropyl benzene to the open mill, and passing a resulting mixture through rollers of the open mill for 5 times at 50° C., to yield a rubber for an elastomer of a flexible joint.

Example 4

1. Weighing 100 parts by weight of hydrogenated nitrile raw rubber Therban 4307, 15 parts by weight of fumed silica, 25 parts by weight of aramid fiber pulp, 50 parts by weight of Cabot carbon black N330, 5 parts by weight of liquid nitrile rubber, 3 parts by weight of zinc oxide, 0.5 parts by weight of stearic acid, 0.6 parts by weight of the antioxidant 4010NA (N-Isopropyl-N'-phenyl-4-phenylenediamin), 0.9 parts by weight of the antioxidant RD (poly(1,2-dihydro-2,2,4-trimethyl-quinoline)), and 6 parts by weight of di-tert-butylperoxyisopropyl benzene;

2. Plasticating the hydrogenated nitrile raw rubber in a first internal mixer at 135° C. for 3 min, collecting a resulting product and cooling for 19 hours, to yield a plasticized rubber;
3. Preheating the liquid nitrile rubber in an electromagnetic oven at 85° C. for 3.5 hours;
4. Adding the plasticized rubber to a second internal mixer, further adding the aramid fiber pulp, the zinc oxide, the stearic acid, the antioxidant 4010NA and the antioxidant RD to the second internal mixer for first mixing for 2 min; adding the Cabot carbon black N330 to the second internal mixer for second mixing for 2 min; adding the fumed silica and the preheated liquid nitrile rubber to the second internal mixer for third mixing for 3 min; collecting a discharged product when a temperature of the second internal mixer is 140° C.;
5. Adding the discharged product to an open mill, further adding di-tert-butylperoxyisopropyl benzene to the open mill, and passing a resulting mixture through rollers of the open mill for 6 times at 50° C., to yield a rubber for an elastomer of a flexible joint.

Example 5

1. Weighing 100 parts by weight of hydrogenated nitrile raw rubber Therban 4307, 35 parts by weight of fumed silica, 10 parts by weight of aramid fiber pulp, 30 parts by weight of Cabot carbon black N330, 15 parts by weight of liquid nitrile rubber, 7 parts by weight of zinc oxide, 3 parts by weight of stearic acid, 1.6 part by weight of the antioxidant 4010NA (N-Isopropyl-N'-phenyl-4-phenylenediamin), 2.4 parts by weight of the antioxidant RD (poly(1,2-dihydro-2,2,4-trimethyl-quinoline)), and 7 parts by weight of di-tert-butylperoxyisopropyl benzene;
2. Plasticating the hydrogenated nitrile raw rubber in a first internal mixer at 130° C. for 4 min, collecting a resulting product and cooling for 16 hours, to yield a plasticized rubber;
3. Preheating the liquid nitrile rubber in an electromagnetic oven at 80° C. for 4 hours;
4. Adding the plasticized rubber to a second internal mixer, further adding the aramid fiber pulp, the zinc oxide, the stearic acid, the antioxidant 4010NA and the antioxidant RD to the second internal mixer for first mixing for 3 min; adding the Cabot carbon black N330 to the second internal mixer for second mixing for 2 min; adding the fumed silica and the preheated liquid nitrile rubber to the second internal mixer for third mixing for 4 min; collecting a discharged product when a temperature of the second internal mixer is 140° C.;
5. Adding the discharged product to an open mill, further adding di-tert-butylperoxyisopropyl benzene to the open mill, and passing a resulting mixture through rollers of the open mill for 6 times at 50° C., to yield a rubber for an elastomer of a flexible joint.

The tear strength and high-temperature aging resistance of the rubber for elastomers of flexible joints prepared in Examples 1 to 3 were measured in accordance with standard methods in the related art, and the test results are shown in Table 1.

TABLE 1

Performance data of rubber for elastomers of flexible joints prepared in Examples 1 to 3

| Test items | | Test standard | Unit | Test results | | |
|---|---|---|---|---|---|---|
| | | | | Example 1 | Example 2 | Example 3 |
| Properties before thermal aging | Hardness | GB/T531.1 | Shore A | 82 | 80 | 78 |
| | Tensile strength | GB/T 528 | MPa | 25.4 | 23.5 | 24.1 |
| | Tensile elongation | GB/T 528 | % | 564 | 512 | 535 |
| | Tear strength | GB/T 529 | kN/m | 58 | 55 | 59 |
| | Adhesive strength | GB/T 12830 | MPa | 14.1 | 13.5 | 14.6 |
| Properties after thermal aging at 150° C. for 168 h | Hardness | GB/T531.1 | Shore A | 84 | 82 | 81 |
| | Tensile strength | GB/T 528 | MPa | 26.5 | 25.1 | 25.8 |
| | Elongation at break | GB/T 528 | % | 541 | 532 | 520 |
| | Tear strength | GB/T 529 | kN/m | 62 | 59 | 61 |
| | Adhesive strength | GB/T 12830 | MPa | 13.2 | 12.8 | 13.5 |

As can be seen from Table 1, the rubber for elastomers of flexible joints prepared in Examples 1-3 has excellent tear strength and good adhesion with the reinforced steel plates. After 168 hours of thermal aging at 150° C., the properties of the rubber show a small decrease compared with the data before aging, and some of the performance data show a slight increase. It can be seen that the rubber for elastomers of flexible joints prepared by the disclosure has excellent tear strength and high-temperature aging resistance, which will significantly extend the fatigue life of the elastomers of flexible joints.

It will be obvious to those skilled in the art that changes and modifications may be made, and therefore, the aim in the appended claims is to cover all such changes and modifications.

What is claimed is:

1. A method for preparing a rubber for an elastomer of a flexible joint, the method comprising:

1) weighing 100 parts by weight of hydrogenated nitrile raw rubber, 15-35 parts by weight of a silica reinforcing agent, 10-25 parts by weight of aramid fiber pulp, 30-50 parts by weight of carbon black, 5-15 parts by weight of liquid nitrile rubber, 3-7 parts by weight of zinc oxide, 0.5-3 parts by weight of stearic acid, 0.5-5 parts by weight of an antioxidant, and 2-8 parts by weight of di-tert-butylperoxyisopropyl benzene as a peroxide crosslinking agent;
2) plasticating the hydrogenated nitrile raw rubber in a first internal mixer at 125-135° C., collecting a resulting product and cooling, to yield a plasticized rubber;
3) preheating the liquid nitrile rubber at a temperature of 80-85° C.;
4) adding the plasticized rubber to a second internal mixer, further adding the aramid fiber pulp, the zinc oxide, the stearic acid, and the antioxidant to the second internal mixer for first mixing; adding the carbon black to the second internal mixer for second mixing; adding the silica reinforcing agent and the preheated liquid nitrile rubber to the second internal mixer for third mixing; collecting a discharged product when a temperature of the second internal mixer is 140° C.;

5) adding the discharged product to an open mill, further adding di-tert-butylperoxyisopropyl benzene to the open mill, and passing a resulting mixture through rollers of the open mill for 5-7 times at 45-55° C., to yield a rubber for an elastomer of a flexible joint.

2. The method of claim 1, wherein the silica reinforcing agent is gas-phase silicon dioxide.

3. The method of claim 1, wherein in 2), the hydrogenated nitrile raw rubber is plasticated in the first internal mixer for 3-4 min.

4. The method of claim 1, wherein in 2), after being plasticated, the hydrogenated nitrile raw rubber is cooled in the first internal mixer for 15-20 hours.

5. The method of claim 1, wherein in 3), the liquid nitrile rubber is preheated for 3-4 hours.

6. The method of claim 1, wherein in 4), the first and second mixing last for 2-3 min, and the third mixing lasts for 3-5 min.

7. A rubber for an elastomer of a flexible joint, being prepared according to the method of claim 1.

* * * * *